(12) United States Patent
Vilhuber

(10) Patent No.: US 7,571,317 B1
(45) Date of Patent: Aug. 4, 2009

(54) PROVIDING USER NOTIFICATION SIGNALS IN PHONES THAT USE ENCRYPTION

(75) Inventor: Jan Vilhuber, San Luis Obispo, CA (US)

(73) Assignee: Cisco Technology, Inc., San Jose, CA (US)

( * ) Notice: Subject to any disclaimer, the term of this patent is extended or adjusted under 35 U.S.C. 154(b) by 812 days.

(21) Appl. No.: 10/242,509

(22) Filed: Sep. 11, 2002

(51) Int. Cl.
*H04L 9/00* (2006.01)

(52) U.S. Cl. .................. 713/161; 380/247; 380/255; 370/352; 370/394; 455/410

(58) Field of Classification Search ................. 713/150, 713/161; 455/410; 380/247
See application file for complete search history.

(56) References Cited

U.S. PATENT DOCUMENTS

| | | | | |
|---|---|---|---|---|
| 6,243,376 B1* | 6/2001 | Ng et al. | ..................... | 370/352 |
| 6,345,074 B1* | 2/2002 | Turk et al. | ..................... | 375/341 |
| 6,404,746 B1* | 6/2002 | Cave et al. | ..................... | 370/262 |
| 6,813,264 B2* | 11/2004 | Vassilovski | ..................... | 370/352 |
| 6,857,072 B1* | 2/2005 | Schuster et al. | ............. | 713/160 |
| 6,918,034 B1* | 7/2005 | Sengodan et al. | ............ | 713/160 |
| 6,967,958 B2* | 11/2005 | Ono et al. | ..................... | 370/401 |
| 6,981,193 B2* | 12/2005 | Park | ......................... | 714/747 |
| 7,099,274 B2* | 8/2006 | Park | ......................... | 714/747 |
| 2003/0018918 A1* | 1/2003 | Natsuno et al. | ............ | 713/201 |
| 2003/0128696 A1* | 7/2003 | Wengrovitz et al. | ......... | 370/352 |
| 2003/0137938 A1* | 7/2003 | Belanger et al. | ............. | 370/230 |
| 2003/0167394 A1* | 9/2003 | Suzuki et al. | ............... | 713/168 |
| 2006/0230143 A1* | 10/2006 | Ziegler et al. | ............... | 709/224 |

OTHER PUBLICATIONS

Internet Engineering Task Force, Internet-Draft, Baugher et a l, Jun. 2002.*
Cisco Systems, Inc., "Cisco IP Phone 790IG and 7910G+SW (+SW model includes a two-port 10/100 BaseT Ethernet Switch)," Data Sheet, 2000, pp. 1-3.
Cisco Systems, Inc., "Cisco IP Phone Expansion Module 7914," Data Sheet, 2001, pp. 1-4
Cisco Systems, Inc., "Cisco IP Conference Station 7935," Data Sheet, 2001, pp. 1-4.
Cisco Systems, Inc., "Cisco IP Phone 7940G," Data Sheet, 2000, pp. 1-4

(Continued)

*Primary Examiner*—Nasser G Moazzami
*Assistant Examiner*—Fikremariam Yalew
(74) *Attorney, Agent, or Firm*—Hickman Palermo Truong & Becker LLP

(57) ABSTRACT

A method for providing user notification signals in digital phone such as IP phones or cell phones that use encryption. In one embodiment, a digital phone receives an encrypted data packet. The phone determines that the encrypted data packet satisfies a criterion. The phone generates a user notification signal that is perceivable by a user of the phone in response to determining that the encrypted data packet does not satisfy the criterion. The user notification signal may comprise a tone, synthesized speech, or other signal that is audible in a handset or speaker of the phone. Alternatively, the user notification signal is visually displayed in an electronic display of the phone. The criterion may comprise a failure to authenticate one or more encrypted data packets that are provided to the phone in a secure protocol. The process may be performed at a voice gateway or cellular base station.

43 Claims, 4 Drawing Sheets

OTHER PUBLICATIONS

Cisco Systems, Inc., "Cisco IP Phone 7960G," Data Sheet, 2000, pp. 1-4.

J. Sjoberg, et al., "Real-Time Transport Protocol (RTP) Payload Format and File Storage Format for the Adaptive Multi-Rate (AMR) and Adaptive Multi-Rate Wideband (AMR-WB) Audio Codecs," Jun. 2002, pp. 1-49.

Baugher, et al., "The Secure Real-time Transport Protocol, <draft-ietf-avt-srtp-05.txt>," Jun. 2002, pp. 1-48.

* cited by examiner

PROVIDING USER NOTIFICATION SIGNALS IN PHONES THAT USE ENCRYPTION

FIELD OF THE INVENTION

The present invention generally relates to telephone handsets and desk sets. The invention relates more specifically to a providing user notification signals in digital phones that use packet voice communication.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Internet Protocol ("IP") telephony using Voice over Internet Protocol ("VoIP") approaches is gaining widespread use. In IP telephony, spoken words are transformed into a digital representation that is packetized and communicated through a packet-routing network from the calling party to the called party. At a gateway or other network node associated with the called party, packets representing a call are re-assembled, converted from digital to analog form, and audibly presented to the called party.

To prevent unauthorized use of VoIP networks, and to protect VoIP calls against interception by unauthorized parties, secure VoIP protocols are emerging. With a secure VoIP protocol, voice data packets are encrypted at a location near the calling party, transmitted in the network in encrypted form, and decrypted at a location near the called party. An example of a secure VoIP protocol is secure RTP, defined at the time of this writing in an IETF internet-draft, "draft-ietf-avt-srtp-05.txt".

In some instances, the processor, firmware or software of the called party's IP phone may drop one or more packets of an ongoing packet voice call between a calling party and a called party. The called party's IP phone may determine that packets do not meet certain requirements, in which case the IP phone drops the encrypted data packets. The requirements may vary according to user needs or the capabilities of the IP phone. For example, the IP phone may drop packets because the IP phone cannot authenticate the originating node that sent the data packets.

As a result of an IP phone dropping packets, the party using the IP phone may hear a period of silence, or some other difference in line or voice quality, or may hear no perceivable effect. If silence or a change in line or voice quality occur, the party may believe that the telephone connection is lost, or that a problem exists with the IP phone, in the IP network, or with a service provider that is providing VoIP service. Consequently, the party may hang up the IP phone erroneously, terminating the conversation.

Based upon the foregoing, there is a clear need for providing some form of user notification that indicates a cause of silence or unexpected conditions experienced by a party who is using an IP phone. For example, if the party became aware that authentication failure or other conditions caused a period of silence, then the user might not hang up the IP phone.

Accordingly, there is a need in this field for a way to provide user notification signals in IP phones. There is a particular need for an approach for providing user notification signals in IP phones that use encryption, for example, when the IP phone drops data packets due to authentication failure or other conditions.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
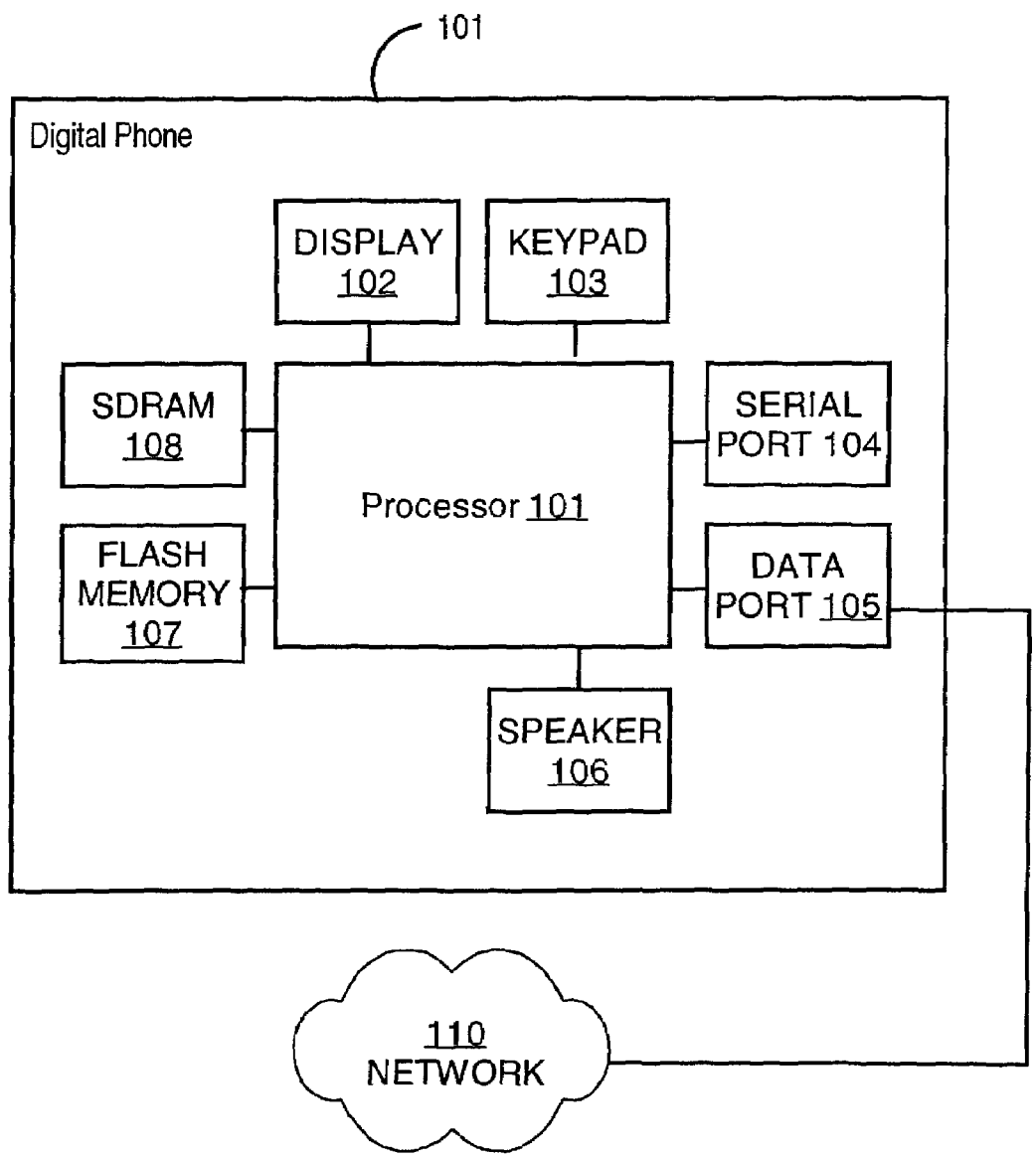
FIG. 1 is a block diagram that illustrates an overview of an IP phone.

A method and apparatus for providing user notification signals in phones that use packet voice communication is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The needs identified in the foregoing Background, and other needs and objects that will become apparent for the following description, are achieved in the present invention, which comprises, in one aspect, a method for providing user notification signals in phones that use encryption. In one embodiment, a voice data packet is received. A test is performed to determine whether the voice data packet satisfies a criterion. A user notification signal, which is perceivable by a user of the phone, is generated in response to determining that the voice data packet does not satisfy the criterion.

The user notification signal may comprise a tone, synthesized speech, or other signal that is audible in a handset or speaker of the phone. Alternatively, the user notification signal is visually displayed in an electronic display of the phone. Use of an audible signal is expected to be more readily perceived by users who are not, for one reason or another, looking at the display of the phone at the time that a packet drop occurs.

The criterion may comprise a failure to authenticate one or more encrypted data packets that are provided to the phone in a secure protocol, or some other security failure or detection of an attack. Thus, in one embodiment, the phone drops the encrypted data packet because it cannot be authenticated, and in response to dropping the encrypted data packet, a user notification signal is generated.

In another embodiment, logic for generating a user notification signal is implemented at a voice gateway that is communicatively coupled to a conventional analog or electronic phone. For example, the gateway determines that its processor has dropped an encrypted packet that arrived from another node using a secure VoIP protocol. In response to dropping the packet, the gateway generates an audible or visual user notification signal and sends the signal to the phone.

Certain embodiments described herein involve IP phones, or IP voice gateway devices that are connected to digital or analog phones. Other embodiments may involve use of any other form of digital phone that uses packetized voice communication, including encrypted voice data packet communication, with or without authentication. In these embodiments, processors in the digital phone, voice gateway, or other processor that is communicatively coupled to the digital phone may execute or perform the processes that are described herein. Still other embodiments may involve use of cellular radiotelephones. In these embodiments, the processes described herein may be performed by processors in the cell phone, in a base station, or in a ground station.

FIG. 1 is a block diagram that illustrates an example Internet Protocol (IP) phone 100, in which one embodiment may be implemented.

IP phone 100 comprises a processor 101 that executes instructions with respect to data or signals. IP phone 100 further comprises a display 102, keypad 103, serial port 104, data port 105, speaker 106, flash memory 107, and SDRAM 108, which are communicatively coupled to processor 101.

Data port 105 is communicatively coupled to an IP network 110, which may comprise a local network, wide area network, or one or more internetworks. Packetized voice data and control packets are sent and received to and from IP phone 100 through network 110. A terminal may be coupled to serial port 104 for programming the IP phone 100 or diagnosing faults. SDRAM 108 and flash memory 107 store instructions and configuration information for controlling operation of processor 101 and other elements of IP phone 100. Keypad 103, display 102, and speaker 106 provide a user interface to receive dialed digits, display call status and directory information, and present audible speech and sound.

IP phone 100 may include other components, which for the purposes of clarity are not depicted in FIG. 1. For example, speaker 106 is intended to broadly represent both a loudspeaker, as in a speakerphone, and the combination of a microphone and speaker as are found in a handset. Commercially available examples of IP phones include the Cisco IP Phone 7910G, 7940G, 7960G, from Cisco Systems, Inc., San Jose, Calif.

Figure 2:
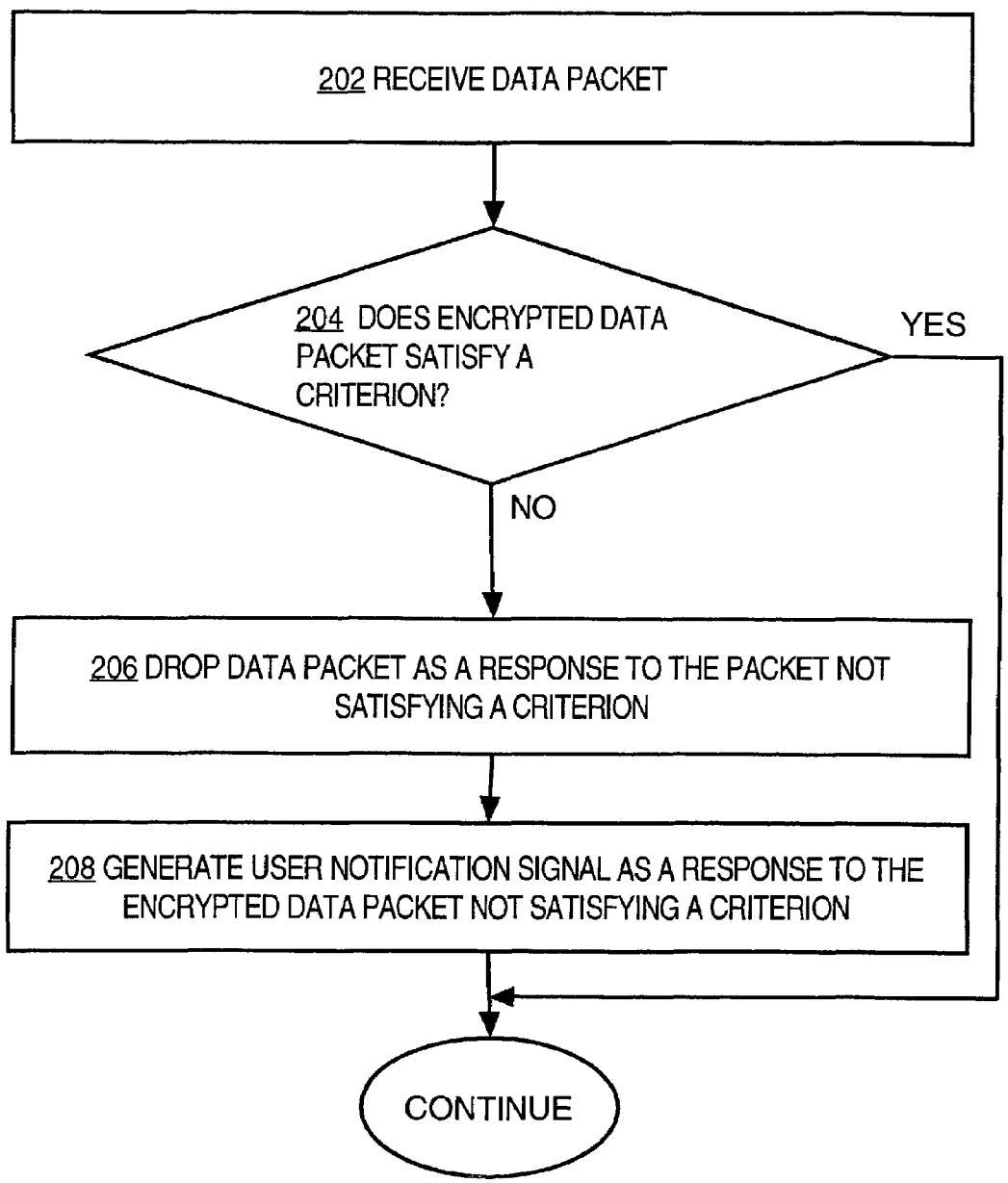
FIG. 2 is a flow diagram that illustrates a high level overview of one embodiment of a method for providing user notification signals in IP phones that use encryption.
Figure 3:
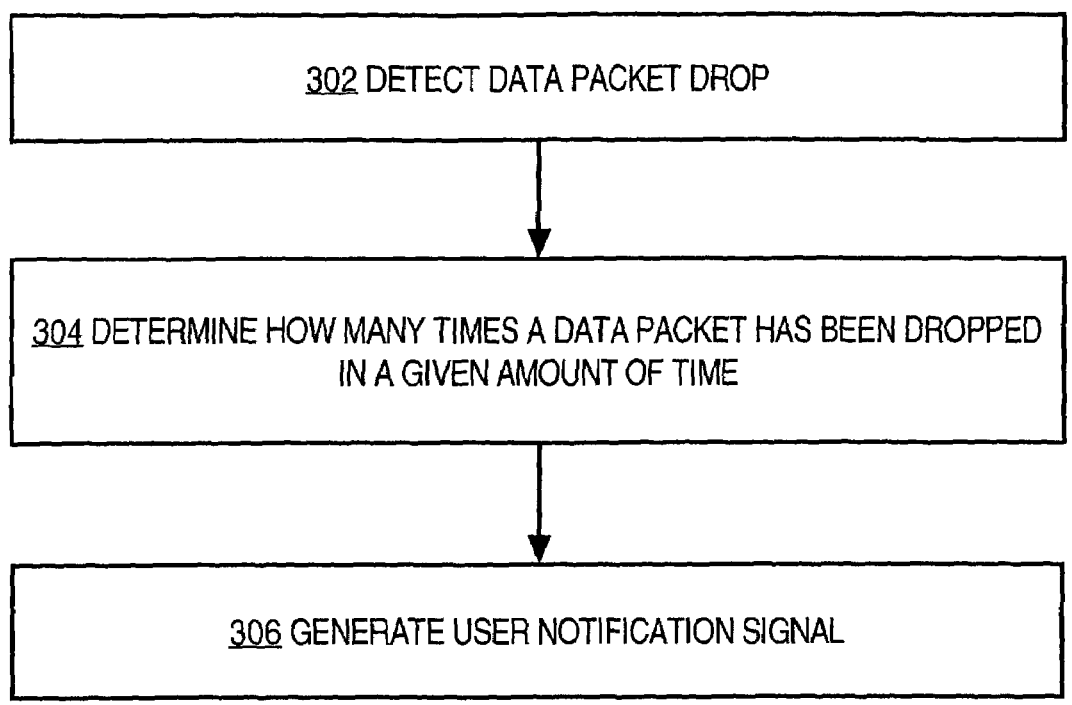
FIG. 3 is a flow diagram that illustrates a high level overview of another embodiment of a method for providing user notification signals in IP phones that use encryption.

FIG. 2 is a flow chart illustrating a method of providing user notification signals in IP phones that use encryption. For purposes of illustrating a clear example, both FIG. 2 and FIG. 3 are described herein with reference to the example IP phone of FIG. 1. However, the invention is not limited to the implementation in these examples, and in particular, processes similar to FIG. 2 may be used with a voice gateway that is coupled to a non-IP digital or analog phone. In an IP phone embodiment, the steps of FIG. 2 may be implemented using one or more software elements that are resident in flash memory 107 or SDRAM 108 and executed by processor 101.

In step 202, an encrypted data packet is received. For example, processor 101 of IP phone 100 receives a packet from network 110. In other embodiments, the encrypted packet may be received at a voice gateway, such as a router acting in the role of a gateway. In one embodiment, the packet received in step 202 is encrypted according to a specified protocol. For example, Secure Real-time Transport Protocol (SRTP) may be used. SRTP is defined at the time of this writing in an IETF internet-draft, "draft-ietf-avt-srtp-05.txt" and the related Real-time Transport Protocol (RTP) is defined in IETF RFC 3267.

Alternatively, any other voice protocol that uses encryption, with or without authentication, may be used. For example, IPsec with authentication may be used. The use of an authentication approach with an encrypted voice protocol is considered essential to prevent the problem of decrypting and presenting to a user, in incomprehensible audible form, a non-authentic packet that contains unusable data.

Embodiments also may be used with protocols that provide encryption but without authentication, and that provide a way to determine whether the result of decryption is an invalid packet. Thus, appropriate processing algorithms or heuristics may be applied to determine that a decryption operation transformed an encrypted packet into a cleartext packet that represents unintelligible voice information, as opposed to intelligible voice, utterances, or legitimate "noise." In these approaches, the processing algorithms or heuristics function as a form of authentication.

Further, when the description herein refers to IP phone 100 performing one or more operations, such description is intended broadly to refer to performing such operations by or through any constituent element of an IP phone, such as a processor or DSP.

In step 204, a test is performed to determine whether the encrypted data packet satisfies a criterion. Step 204 represents several tests that may be performed. For example, in an IP phone that is processing SRTP packets, step 204 may represent processor 101 determining whether an originating address value in a packet can be authenticated as an allowed sender of the packet. If the IP phone successfully authenticates the sender of the encrypted data packet, then the encrypted data packet satisfies the criterion. If the processor cannot authenticate the packet, then the packet does not satisfy the criterion, and control passes to step 206. Step 204 may also involve determining whether an IPsec operation failed to properly perform authentication.

There are many reasons why an encrypted data packet may fail to satisfy the criterion. For example, IP phone 100 may be unable to authenticate or decrypt the encrypted data packet because the encrypted data packet has been fabricated or spoofed by a malicious user. This situation might arise if a hacker is trying to attack a phone conversation or an IP phone system by sending a stream of invalid packets that IP phone 100 then tries to authenticate. Thus, it is useful to notify a user of the IP phone that the phone, a gateway to which the phone is coupled, or other network elements are under attack.

There may be more than one criterion that the encrypted data packet must satisfy, so that processor 101 performs a plurality of tests of the data packet in comparison to multiple criteria.

In step 206, the IP phone drops the encrypted data packet in response to the packet failing to satisfy the criterion. Typically, in an IP phone, when one or more encrypted data packets are dropped due to authentication failure, the user of the IP phone hears a period of silence.

In step 208, a user notification signal is generated in response to dropping a packet, as in step 206. In one embodiment, the user notification signal may be generated in response to dropping one packet, so that the user notification signal is generated whenever encrypted data has been dropped. However, this approach may result in generating an excessive number of user notification signals or consuming excessive processing cycles. Accordingly, in an alternative embodiment, which is described further below with respect to FIG. 3, the user notification signal is generated after a specified number of encrypted data packets have been dropped. The specified number of packets may be configurable by an administrator or technician on a per-phone basis or for each gateway that interoperates with a specified set of phones.

In one embodiment, the user notification signal is an audible tone, such as a buzz, "beep" or other distinctive tone that a user associates with an error condition, or has a negative connotation. Alternatively, different types of user notification signals may be used. For example, a different user notification signal may be associated with each of a plurality of different criteria. The phone may emit a buzz or negative signal in response to detecting dropped packets due to an authentication failure, and may emit a "ping" or neutral signal in response to detecting dropped packets due to other reasons not associated with an attack on a communication or network element. In this approach, the user notification signal communicates information about why an encrypted data packet was dropped. When the user notification signal is an audible signal, speaker 106 emits the user notification signal. Alternatively, the user notification signal comprises a text message or other visually displayable information that is displayed using display 102 of the IP phone. For example, the display 102 may show a message stating "AUTHENTICATION FAILURE," or a similar message.

FIG. 3 is a flow chart illustrating another embodiment of a method of providing a user notification signal in an IP phone that uses encryption.

In step 302, a packet drop is detected. For example, under control of appropriate software or firmware, processor 101 determines that a particular routine it is executing has resulted in dropping a data packet. Block 302 may also involve determining a reason why the data packet was dropped, such as an authentication failure, decryption failure, etc.

In step 304, a determination is made about how many times a packet has been dropped by the phone in a given time period. Step 304 may include program logic for accumulating a counter for each of a plurality packet drop conditions, maintaining a timer, and determining whether the value of each counter exceeds a specified threshold within a particular time. This approach implements a policy under which a user using an IP phone does not want to be notified when packet drop events are widely separated in time, because the effect on voice quality is generally not perceivable. However, if numerous data packets are dropped in a relatively short time, then the user may perceive a period of silence on the line, and therefore giving a notification signal is appropriate.

In step 306, a user notification signal is generated, using one of the processes described above for step 208 of FIG. 2.

In yet another alternative embodiment, the logic of FIG. 2 or FIG. 3 is performed at a voice gateway that is communicatively coupled to one or more conventional digital or analog phones. The voice gateway may comprise a specially configured packet router, a cable modem, etc. For example, the Cisco 2600 Series routers, 3600 series routers, or ubr900 series cable modems may be used.

Figure 4:
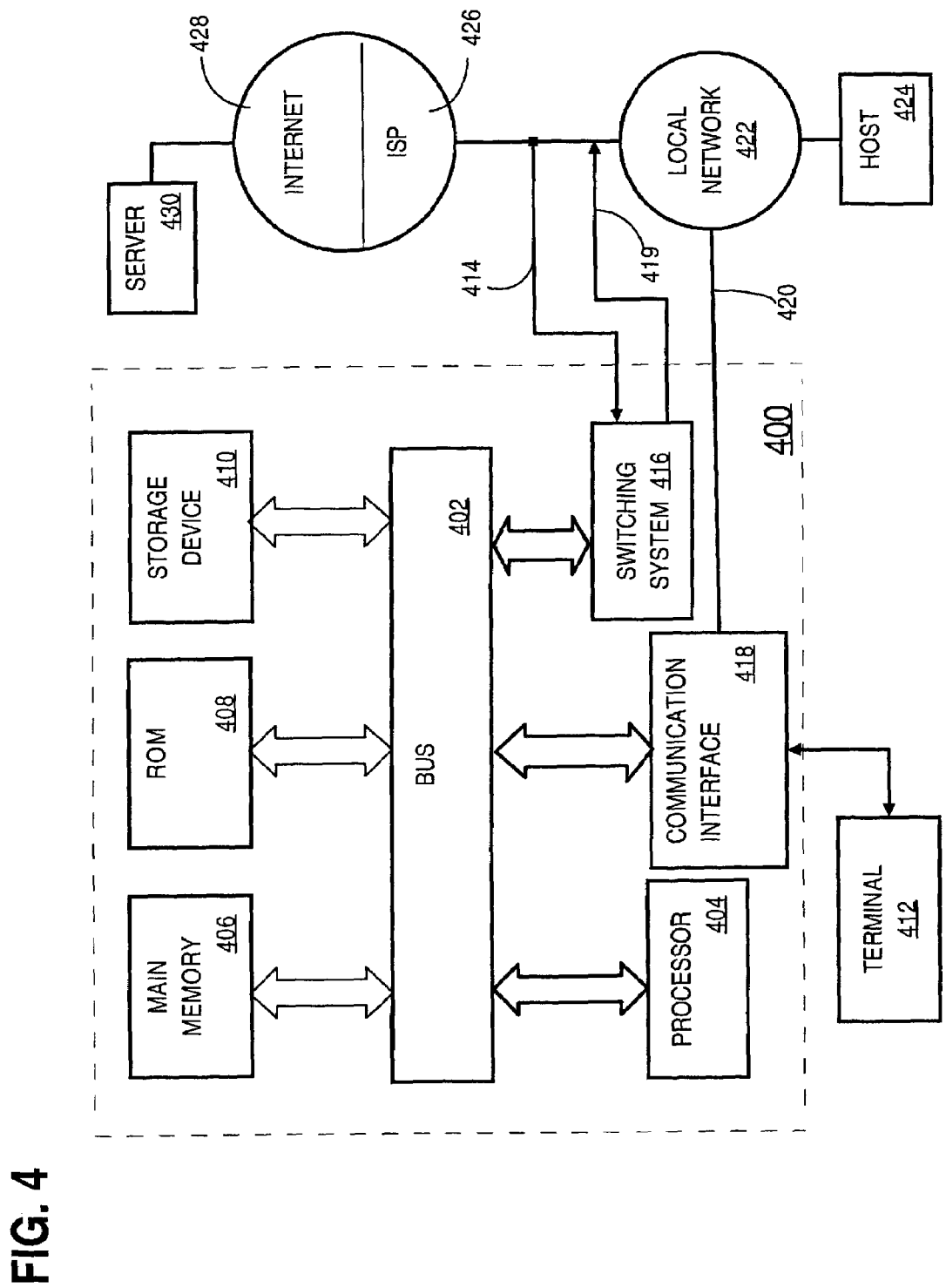
FIG. 4 is a block diagram that illustrates a voice gateway with which an alternate embodiment may be implemented.

FIG. 4 is a block diagram that illustrates a computer system 400 acting as a voice gateway, and upon which this alternative embodiment may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for a method and apparatus for providing user notification signals in IP phones that use encryption. According to one embodiment of the invention, a method and apparatus for providing user notification signals in IP phones that use encryption is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for a method and apparatus for providing user notification signals in Internet Protocol IP phones that use encryption as described herein.

The received code may be executed by processor 404 as it is received, and/or stored in storage device 410, or other non-volatile storage for later execution. In this manner, computer system 400 may obtain application code in the form of a carrier wave.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for a method of providing user notification signals in IP phones that use encryption. According to one embodiment of the invention, a method of providing user notification signals in IP phones that use encryption are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for a method and apparatus for providing user notification signals in IP phones that use encryption as described herein.

The received code may be executed by processor 404 as it is received, and/or stored in storage device 410, or other non-volatile storage for later execution. In this manner, computer system 400 may obtain application code in the form of a carrier wave.

Using these approaches, a user listening to an IP phone is provided with a real-time alert about an attack on a conversation, phone or network element. The user is thus concurrently informed that there is something wrong with the connection, but that the connection is still active. Thus, the user is informed that an active connection exists, but voice information is not available due to one of various problems, the most important of which is typically an authentication failure. As a result, user confusion or disorientation is avoided.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing user notification signals in a digital phone that uses packetized voice communication, the method comprising the computer-implemented steps of:
   receiving an encrypted voice data packet in the digital phone;
   in the digital phone, attempting to authenticate the voice data packet;
   determining in the digital phone whether the voice data packet was dropped by a routine executing in the digital phone;
   in response to determining in the digital phone that the voice data packet was dropped by the routine executing in the digital phone, determining in the digital phone whether a number of dropped voice data packets exceeds a specified number within a time period; and
   in response to determining in the digital phone that the number of dropped voice data packets exceeds the specified number within the time period, generating in the digital phone a user notification signal that is perceivable by a user of the phone.

2. A method as recited in claim 1, wherein the user notification signal is audible in a speaker of the phone.

3. A method as recited in claim 1, wherein the user notification signal is audible in a handset of the phone.

4. A method as recited in claim 1, wherein the user notification signal is displayed in an electronic display of the phone.

5. A method as recited in claim 1, wherein the user notification signal is an audible tone.

6. A method as recited in claim 1, wherein the user notification signal comprises synthesized speech.

7. A method as recited in claim 1, wherein the voice data packet is encrypted using Secure Real-time Transport Protocol (SRTP).

8. A method as recited in claim 1, wherein the voice data packet is encrypted using a secure voice protocol, and wherein the user notification signal comprises text that is visually displayed in an electronic display of the phone.

9. A method as recited in claim 1, wherein the voice data packet is encrypted using Secure Real-time Transport Protocol (SRTP), and wherein the user notification signal comprises a sound that is audible in a handset or speaker of the phone.

10. A method as recited in claim 1, further comprising the steps of:
    determining whether the voice data packet satisfies one of a plurality of criteria; and
    when the voice data packet fails to satisfy one of the criteria,
       selecting one of a plurality of different user notification signals based on which one of the plurality of criteria the packet failed to satisfy;
       generating the selected user notification signal in a manner that is perceivable by the user of the phone.

11. A method as recited in claim 1, wherein the digital phone is an IP phone.

12. A method as recited in claim 1, wherein the digital phone is a cellular radiotelephone.

13. A method as recited in claim 1, wherein the voice data packet is encrypted using a secure voice-over-IP protocol, and further comprising decrypting the encrypted voice data packet and verifying validity of a cleartext packet resulting from the decrypting, and wherein the user notification signal is generated in response to failing to verify validity of the decrypted cleartext packet.

14. A method of providing audible error signals in IP phones that use encryption, the method comprising the computer-implemented steps of:
receiving a data packet at a digital signal processor of an IP phone, wherein the data packet is encrypted using a secure voice-over-IP protocol;
in the IP phone, attempting to authenticate the encrypted data packet;
determining in the IP phone whether the voice data packet was dropped by a routine executing in the IP phone; and
in response to determining in the digital phone that the voice data packet was dropped, determining whether a number of dropped voice data packets exceeds a specified number within a time period; and
in response to determining in the IP phone that a number of voice data packets exceeds a specified number within a time period, generating in the IP phone an audible error signal in a speaker or handset of the IP phone.

15. A method as recited in claim 14, wherein the encrypted data packet is encrypted using SRTP.

16. A method as recited in claim 14, further comprising the steps of:
determining whether the voice data packet satisfies one of a plurality of criteria; and
when the voice data packet fails to satisfy one of the criteria,
selecting one of a plurality of different user notification signals based on which one of the plurality of criteria the packet failed to satisfy;
generating the selected user notification signal in a manner that is perceivable by the user of the IP phone.

17. A volatile or non-volatile computer-readable medium carrying one or more sequences of instructions for providing user notification signals in a digital phone that uses packetized voice communication, wherein the execution of one or more sequences of instructions by one or more processors causes the one or more processors to perform the steps of:
receiving an encrypted voice data packet in the digital phone;
in the digital phone, attempting to authenticate the voice data packet;
determining in the digital phone whether the voice data packet was dropped by a routine executing in the digital phone;
in response to determining in the digital phone that the voice data packet was dropped by the routine executing in the digital phone, determining in the digital phone whether a number of dropped voice data packets exceeds a specified number within a time period; and
in response to determining in the digital phone that the number of dropped voice data packets exceeds the specified number within the time period, generating in the digital phone a user notification signal that is perceivable by a user of the phone.

18. A volatile or non-volatile computer-readable medium as recited in claim 17, further comprising instructions which when executed cause the one or more processors to perform the steps of:
determining whether the voice data packet satisfies one of a plurality of criteria; and
when the voice data packet fails to satisfy one of the criteria,
selecting one of a plurality of different user notification signals based on which one of the plurality of criteria the packet failed to satisfy;
generating the selected user notification signal in a manner that is perceivable by the user of the phone.

19. A volatile or non-volatile computer-readable medium as recited in claim 17, wherein the voice data packet is encrypted using a secure voice protocol, and wherein the user notification signal comprises text that is visually displayed in an electronic display of the phone.

20. A digital phone that uses packetized voice communication, comprising:
one or more processors;
means for receiving an encrypted voice data packet;
means for attempting to authenticate the voice data packet;
means for determining in the digital phone whether the voice data packet was dropped by a routine executing in the digital phone;
means for determining in the digital phone, in response to determining in the digital phone that the voice data packet was dropped by the routine executing in the digital phone, whether a number of dropped voice data packets exceeds a specified number within a time period; and
means for generating in the digital phone, in response to determining in the digital phone that the number of dropped voice data packets exceeds the specified number within the time period, a user notification signal that is perceivable by a user of the phone.

21. The digital phone as recited in claim 20, comprising means for generating the user notification signal audibly in a speaker of the phone.

22. The digital phone as recited in claim 20, comprising means for generating the user notification signal audibly in a handset of the phone.

23. The digital phone as recited in claim 20, comprising means for displaying the user notification signal in an electronic display of the phone.

24. The digital phone as recited in claim 20, comprising means for generating the user notification signal as an audible tone.

25. The digital phone as recited in claim 20, comprising means for generating the user notification signal as synthesized speech.

26. The digital phone as recited in claim 20, wherein the receiving means comprises means for receiving the voice data packet encrypted using Secure Real-time Transport Protocol (SRTP).

27. The digital phone as recited in claim 20, wherein the receiving means comprises means for receiving the voice data packet encrypted using a secure voice protocol, and comprising means for visually displaying the user notification signal as text in an electronic display of the phone.

28. The digital phone as recited in claim 20, wherein the receiving means comprises means for receiving the voice data packet encrypted using Secure Real-time Transport Protocol (SRTP), and comprising means for generating the user notification signal audibly in a handset or speaker of the phone.

29. The digital phone as recited in claim 20, further comprising:
means for determining whether the voice data packet satisfies one of a plurality of criteria; and
means operable when the voice data packet fails to satisfy one of the criteria for selecting one of a plurality of different user notification signals based on which one of the plurality of criteria the packet failed to satisfy and for generating the selected user notification signal in a manner that is perceivable by the user of the phone.

30. The digital phone as recited in claim 20, wherein the digital phone is an IP phone.

31. The digital phone as recited in claim 20, wherein the digital phone is a cellular radiotelephone.

32. A digital phone that uses packetized voice communication, comprising:
- a processor;
- a computer-readable medium comprising one or more stored sequences of instructions which, when executed by the processor, cause the processor to perform the steps of:
- receiving an encrypted voice data packet;
- attempting to authenticate the voice data packet;
- determining in the digital phone whether the voice data packet was dropped by a routine executing in the digital phone;
- in response to determining in the digital phone that the voice data packet was dropped by the routine executing in the digital phone, determining in the digital phone whether a number of dropped voice data packets exceeds a specified number within a time period; and
- in response to determining in the digital phone that the number of dropped voice data packets exceeds the specified number within the time period, generating in the digital phone a user notification signal that is perceivable by a user of the phone.

33. The digital phone as recited in claim 32, comprising sequences of instructions which when executed cause the user notification signal to be audible in a speaker of the phone.

34. The digital phone as recited in claim 32, comprising sequences of instructions which when executed cause the user notification signal to be audible in a handset of the phone.

35. The digital phone as recited in claim 32, comprising sequences of instructions which when executed cause the user notification signal to be displayed in an electronic display of the phone.

36. The digital phone as recited in claim 32, comprising sequences of instructions which when executed cause the user notification signal to be an audible tone.

37. The digital phone as recited in claim 32, comprising sequences of instructions which when executed cause the user notification signal to comprise synthesized speech.

38. The digital phone as recited in claim 32, comprising sequences of instructions which when executed cause receiving the voice data packet as encrypted using Secure Real-time Transport Protocol (SRTP).

39. The digital phone as recited in claim 32, comprising sequences of instructions which when executed cause receiving the voice data packet as encrypted using a secure voice protocol, and comprising sequences of instructions which when executed cause visually displaying the user notification signal as text in an electronic display of the phone.

40. The digital phone as recited in claim 32, comprising sequences of instructions which when executed cause receiving the voice data packet as encrypted using Secure Real-time Transport Protocol (SRTP), and comprising sequences of instructions which when executed cause the user notification signal to be a sound that is audible in a handset or speaker of the phone.

41. The digital phone as recited in claim 32, further comprising sequences of instructions which when executed cause the one or more processors to perform:
- determining whether the voice data packet satisfies one of a plurality of criteria; and
- when the voice data packet fails to satisfy one of the criteria,
  - selecting one of a plurality of different user notification signals based on which one of the plurality of criteria the packet failed to satisfy;
  - generating the selected user notification signal in a manner that is perceivable by the user of the phone.

42. The digital phone as recited in claim 32, wherein the digital phone is an IP phone.

43. The digital phone as recited in claim 32, wherein the digital phone is a cellular radiotelephone.

* * * * *